(12) United States Patent  
Smith

(10) Patent No.: US 11,896,068 B2  
(45) Date of Patent: Feb. 13, 2024

(54) TO GLOVES AND A METHOD OF MANUFACTURE

(71) Applicant: Detectamet Limited, Richmond, VA (US)

(72) Inventor: Sean Ronald Smith, Glen Allen, VA (US)

(*) Notice: Subject to any disclaimer, the term of this patent is extended or adjusted under 35 U.S.C. 154(b) by 0 days.

(21) Appl. No.: 17/056,328

(22) PCT Filed: Sep. 18, 2020

(86) PCT No.: PCT/GB2020/052271  
§ 371 (c)(1),  
(2) Date: Nov. 17, 2020

(87) PCT Pub. No.: WO2021/053353  
PCT Pub. Date: Mar. 25, 2021

(65) Prior Publication Data  
US 2022/0211129 A1    Jul. 7, 2022

(30) Foreign Application Priority Data

Sep. 20, 2019 (GB) ..................................... 1913591  
Jan. 17, 2020 (GB) ..................................... 2000708

(51) Int. Cl.  
*A41D 19/015* (2006.01)  
*A41D 19/00* (2006.01)  
*A41D 31/30* (2019.01)  
*C08L 13/02* (2006.01)  
*C08L 21/00* (2006.01)  
*C08J 5/00* (2006.01)

(52) U.S. Cl.  
CPC ..... *A41D 19/0006* (2013.01); *A41D 19/0055* (2013.01); *A41D 19/015* (2013.01); *A41D 31/30* (2019.02); *C08J 5/00* (2013.01); *C08L 13/02* (2013.01); *C08L 21/00* (2013.01); *C08K 2201/01* (2013.01); *Y10T 428/1338* (2015.01)

(58) Field of Classification Search  
CPC .............. A41D 19/015; A41D 19/0062; A41D 19/0006; C08K 2201/01; Y10T 428/1338  
See application file for complete search history.

(56) References Cited

U.S. PATENT DOCUMENTS

| | | |
|---|---|---|
| 2004/0154072 A1 | 8/2004 | Connor |
| 2015/0020727 A1 | 1/2015 | Hull |
| 2016/0150840 A1 | 6/2016 | Enomoto et al. |
| 2021/0049811 A1* | 2/2021 | Fedyukov ................. G06T 7/60 |

FOREIGN PATENT DOCUMENTS

| | | | | |
|---|---|---|---|---|
| CA | 2806677 A1 * | 2/2012 | ......... | A41D 19/0062 |
| EP | 3663332 A1 | 6/2020 | | |
| GB | 2372934 A | 9/2002 | | |

(Continued)

*Primary Examiner* — Tajash D Patel  
(74) *Attorney, Agent, or Firm* — GableGotwals

(57) ABSTRACT

A glove of a type worn to provide masking effect between a wear's hand and another surface, such as surface of food stuff. The glove, or fragments thereof, is rendered detectable by X-ray and/or metal detection apparatus. Apparatus and/or indication means can be provided to allow a detected glove or glove portion to be allocated to a particular location and/or personnel to allow, if necessary, remedial action to be taken.

22 Claims, 2 Drawing Sheets

(56) References Cited

FOREIGN PATENT DOCUMENTS

| GB | 2438930 | A | | 12/2007 | |
|----|---------|---|---|---------|---|
| GB | 2555955 | A | | 5/2018 | |
| GB | 2605646 | A | * | 10/2022 | ................ C08J 3/20 |
| JP | 2014237786 | A | | 12/2014 | |
| WO | 2010089904 | A1 | | 8/2010 | |
| WO | WO-2010089904 | A1 | * | 8/2010 | ......... A41D 19/0062 |
| WO | 2013153390 | A1 | | 10/2013 | |
| WO | 2017170426 | A1 | | 10/2017 | |

* cited by examiner

TO GLOVES AND A METHOD OF MANUFACTURE

CROSS-REFERENCE TO RELATED APPLICATIONS

This United States application is the National Phase of PCT Application No. PCT/GB2020/052271 filed 18 Sep. 2020, which claims priority to British Application No. 2000708.4 filed 17 Jan. 2020 and to British Patent Application No. 1913591.2 filed 20 Sep. 2019 to which a US National Phase Application No. 16683446 was filed Nov. 14, 2019, each of which is incorporated herein by reference.

The invention to which this application relates is to the provision of gloves and in particular, although not necessarily exclusively, gloves which are provided to be used as a protective covering for a person's hand, when performing a work operation.

It is well-known that gloves can be used to provide a warming effect when worn on a person's hands in cold environments. It is also known to provide gloves in a form in which the same are relatively thin, typically formed of a rubber or plastics material and which form, when worn, a protective barrier layer for a user's hand and also prevent contamination from the user's hands onto other articles. The material the glove is made from is generally chemically inert material and is sufficiently elastic to permit sufficient dexterity and be sufficiently robust for prolonged wear.

The use of this latter type of glove has become compulsory in many industries and in particular, food and medicine preparation industries and, in general, in any industry where an article or product is being produced for human consumption.

It is found that by providing and requiring a user to wear relatively thinned walled gloves then the gloves are sufficiently thin and formed of a stretchable and pliable material such as rubber or plastic, so as to allow the user to still be able to manipulate their fingers and hands and perform the required work operations. At the same time, the wearing of the gloves prevent contamination from the user's hands and affords an additional preventative against cross-contamination and/or articles or objects which the user may wear such as rings, reaching the food.

Thus, while there are considerable advantages to wearing gloves and the advantages are sufficient so as to make the wearing of the glove is compulsory. However, introducing, depending on the size of the operation, hundreds to thousands of gloves to a manufacturing process adds the possibility of the glove, or a portion thereof, becoming separated from the users hands and contaminating the end-product.

The presence of the dislodged glove or portion thereof in the product is, at the very least, off-putting to the end-user of the product should they come across the glove or dislodged portion and at the other end of the scale, can be hazardous to the end-user of the product should they swallow the glove or portion of the glove. For food manufacturers this leads to product recalls and litigation, both of which are expensive and harmful to the company's reputation.

It is therefore advantageous to formulate the glove products from materials that can be identified even within the foodstuff. One such possibility is the use of a metal detectable material, typically achieved by the addition of magnetic metal particles when the material is in a liquid form. The Applicant's patent GB2438930 describes such a process for producing gloves of this type.

Despite the existence of these form of gloves, it is still found that it is possible for the glove or portions thereof, to still be found to be present in the end product so that during the production process, the presence of the glove or portion thereof, has not been detected and removed and/or the product destroyed. In the ever increasingly litigious environment, the presence of the glove or portion thereof, in addition to providing a risk to the health of the end-user of the product, can lead to significant costs and damages being incurred by the producer of the product in which the glove or portion thereof is found.

It is also known that while the provision of the gloves as being more easily detectable is of advantage there is also a desire to investigate any such occurrence, and the reasons for the occurrence, of a potential contamination so as to be able to report and identify the event accurately to the Health & Safety Authorities, and if necessary, take action to reduce the risk of the potential contamination occurring repeatedly.

The aim of the present invention is therefore to provide a glove which has an increased reliability in terms of the ability to identify the presence of the glove or a portion thereof by introducing a second possibility of detection of contamination from said glove or apportion thereof at the point of use, such as in a manufacturing process.

A further aim of the present invention is to provide apparatus and a method to allow, upon the detection of a potential contamination, the source and the potential cause of the contamination, to be readily identified and as a result, action taken to prevent the contamination occurring again and/or for further investigative work to be undertaken as to identify why the potential contamination occurred.

In a first aspect of the invention, there is provided a glove, said glove formed so as to be located around the palm and back of the hand and the fingers of the hand, said glove formed of a continuous sheet material which is sufficiently pliable so as to allow the manipulation of the user's hand without any substantial restriction and wherein the said glove includes therein one or more materials so as to render the glove, or a fragment thereof, to be detectable by at least X-ray detection apparatus or metal detectable apparatus.

In one embodiment the glove includes material therein to allow the same to be rendered detectable by X-ray detection apparatus and metal detection apparatus.

In one embodiment, at least one of the materials is provided in the form of particles which are dispersed in the material from which the glove is formed when in a liquid condition.

In one embodiment, both the material which is detectable by X-ray apparatus and metal detection apparatus is provided in the form of particles.

In one embodiment, when provided, the particles are provided in a powder form.

In one embodiment, one or both of the metal or X-ray detectable materials, is formed and provided as a liquid which is added to the material from which the glove is formed, when in an uncured pre-polymer condition.

In one embodiment, the material which is detectable by the metal detection apparatus, is a magnetically attractive metal or metal alloy.

In one embodiment there is provided a glove which includes an evenly dispersed quantity of a magnetically detectable material and X-ray detectable material in particulate form.

The electro-magnetically and X-ray detectable materials are preferably in powder form, the average particle size of the powder preferably being between 1 and 200 microns.

Typically, the average particle size is in the range 50 to 200 microns, preferably between 50 to 100 microns.

The material may consist solely of a single metallic substance or it may comprise a mixture of two or more different electro-magnetically detectable materials e.g. combinations of ferromagnetic, ferrimagnetic and antiferromagnetic materials.

The electro-magnetically detectable material is preferably a ferrous oxide typically comprising yFe2O3 also known as magnetite. Alternatively, the material may comprise a bronze alloy of copper with aluminium, manganese, beryllium or chromium. The allow may be an alloy of copper and tin and may include other metals such as zinc or lead. The X-ray detectable material may be a common contrast agent such as barium sulphate (BaSO4) or iodine compounds. The latter may also have inherent antiseptic properties, beneficial for use in food and pharmaceutical manufacture.

In one embodiment, the material which is detectable by the X-ray detection apparatus is barium. In another embodiment, it is iodine and a third iteration may be a combination of the two materials.

In one embodiment, the said metal and X-ray detectable materials, are added to the material from which the sheet material glove is formed, in a manner so as to allow the same to be substantially uniformly dispersed into the material prior to the formation of the glove therefrom. The process of ensuring the additive particles are spread uniformly in the pre-polymer material, whilst avoiding creating bubbles, which compromise the mechanical ability of the glove, is outlined in the patent GB2438930.

In one embodiment, the fragment or fragments of the glove which are most susceptible to be detached from the remainder of the glove during use of the same, are determined and the metal and/or X-ray detectable material, is provided with a greater density at said locations of the glove so as to increase the possibility of the said portions, and the possibility of smaller size fragments of that portion being detected, if they are detached from the glove.

In one embodiment, the said greater density is achieved, by adding the said metal and/or X-ray detectable material as a coating on the said portions, and said greater density is achieved by adding the said metal and/or X-ray detectable material as a coating on the said portion or portions instead of but more typically in addition to the provision of the detectable material within the sheet material which forms the walls of the glove.

In one embodiment the glove may be provided to include a metal or metal alloy so as to render the glove to be only detectable by metal detection apparatus and the glove may include further features and embodiments of the invention as described above and as follows.

In one embodiment the glove is provided with indication means which allow the identity and/or use/and/or time of use and/or location of use to be identified.

In one embodiment the said glove is formed of a material which allows the glove to be classed as a biodegradable which is an important characteristic when one considers that in many instances the gloves are provided for single use purposes and are discarded after use. Conventionally these gloves would add to the problem of waste generation. However by rendering the same biodegradable so they can be dealt with in a managed and environmentally beneficial manner.

In one embodiment the glove includes an antimicrobial agent within the wall of the glove and/or at the surface thereof.

In one embodiment the antimicrobial agent is added as a powder to the other ingredients when in a fluid condition in a reservoir and prior to forming the glove.

In one embodiment the antimicrobial agent includes ionic silver particles which are added during the manufacturing process for the glove so that the antimicrobial agent is located throughout the wall of the glove and thereby provides a substantially continuous reduction of the presence of any potentially contaminating microbes by binding with and damaging microbe cells with which the gloves come into contact.

In addition or alternatively the antimicrobial agent is or includes a photosensitizer so as to be activated by exposure of the glove to light and/or oxygen, typically when the glove is being worn in use.

In one embodiment the antimicrobial agent is, or includes, iodine which can also be used to provide X-ray detectability to the glove.

In a further aspect of the invention there is provided apparatus including a glove, said glove rendered detectable by at least one of metal detection apparatus or X-ray detection apparatus and the apparatus includes a key or table including data relating to one or more parameters relating to the glove and wherein the indication means of the glove are linked to the key or table so as to allow at least one parameter value of the said key or table to be determined and allocated to said glove.

In one embodiment the said indication means is achieved by the provision of a particular colour or pattern of the entire glove or at least part thereof. In one embodiment a predetermined range of colours are defined on the said key or table. In one embodiment the said key or table matches the said range of colours to any, or any combination of, the time of use of the glove, the particular identity of the person or group of persons wearing gloves of that colour, the location of use of the glove and/or a particular status of personnel using the glove.

In one embodiment the said key or table matches the said range of colours with respect to whether the glove is detectable by a metal detectable apparatus, whether the glove is detectable by X-ray detection apparatus or is detectable by both metal and X-ray detection apparatus.

In one embodiment further identification means are provided and selected with reference to the manufacturing process and/or apparatus and as a means of indication to personnel of the particular format of glove which should be worn at that location and/or the different formats of the glove which are available to be selected to be worn.

In one embodiment the antimicrobial agent is, or includes and is aided, by iodine which can also be used to provide X-ray detectability to the glove.

In one embodiment the antimicrobial agent is or includes a photosensitiser so as to be activated by exposure of the glove to light and/or oxygen.

In a further aspect of the invention there is provided a method of manufacturing a glove from a plastics and/or rubber material, said method including the steps of preparing a reservoir of said material in a liquid form, using a quantity of said material to form a continuous wall of the glove on a former and wherein there is added to the said material when in the liquid form, a substance or substances such that when formed, the glove or a fragment thereof is rendered detectable by at least X-ray or metal detection apparatus.

In one embodiment the same or a further substance is added to the material in a liquid form so as to render the glove or fragment thereof, when formed, metal and X-ray detectable.

In one embodiment the same or a further substance is added to the material in a liquid form and/or when formed to provide the glove with an antimicrobial characteristic.

Specific embodiments of the invention are now described with reference to the accompanying drawings; wherein FIG. 1 illustrates a glove formed in accordance with the invention;

Electro-magnetic and/or X-ray interrogation of products leaving a production line is undertaken as a matter of course in many industries. As additives incorporated into the gloves are more dense than the testing foodstuff, they are better able to absorb X-ray radiation and are easily identified by the detection system.

Such inspections enable foreign bodies present in foodstuff to be detected. In this way, contaminated products can be selectively discarded. Gloves worn by workers to protect the product from contamination are generally produced form a polymeric substance (e.g. a plastisol or elastic) and their presence in a product would not at present be detected other than by visual inspection.

The present invention therefore provides a glove for use by operatives on, for example, manufacturing production lines and allows the glove, or a fragment thereof which may become detached from the remainder of the glove, to be detected electro-magnetically and via X-ray apparatus in the event that the glove or a fragment of the same becomes removed from the workers hand and falls into or onto the products during the manufacturing process.

Figure 3:
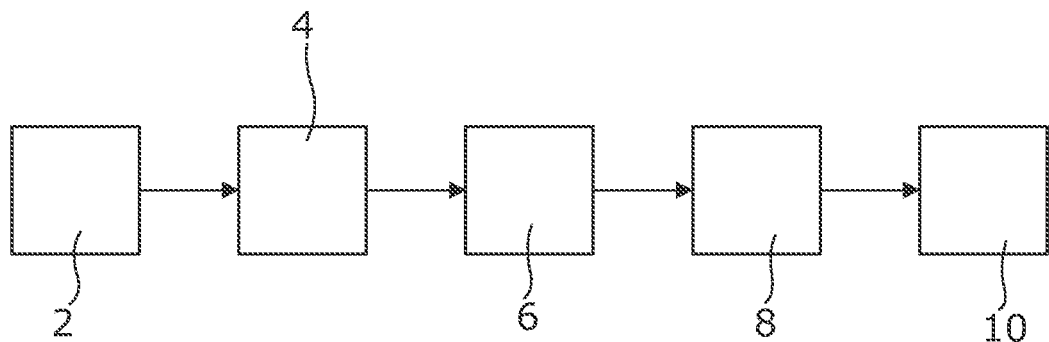
FIG. 3 illustrates the method steps for forming a glove in accordance with one embodiment of the invention.

Referring to FIG. 3 the glove is produced from a plastic material such as a plastisol such as a natural latex, acrylonitrile-butadiene (nitrile) or polyvinylchloride (PVC). The liquid may also include various additives such as plasticisers, stabilisers, accelerators and fillers. The plastic material is initially held in a liquid form (2) and into which electro-magnetic and x-ray absorbent particles are added 4 and X-ray detectable material is added 6. Typically these materials are added so as to be substantially uniformly dispersed in the plastics material and, if required mixing means can be provided to ensure that this occurs and is maintained whilst them material is waiting to be used to form the gloves. The electro-magnetic and/or X-ray detectable materials are preferably mixed with the liquid plastisol to produce a relatively homogeneous mix and the quantity of materials added preferably represents between 3% and 6% by weight (w/v %) of the mix for solid powdered additives. Typically, the quantity is of the order of 5% 10% by weight in total.

When the materials are added in a powder form, the particle size of the majority of the powder is preferably below 200 microns and would usually be above 1 micron. More preferably the particle size of the majority of the powder is in the range 50 to 200 microns and most preferably it is in the range 50 to 100 microns.

Figure 1:
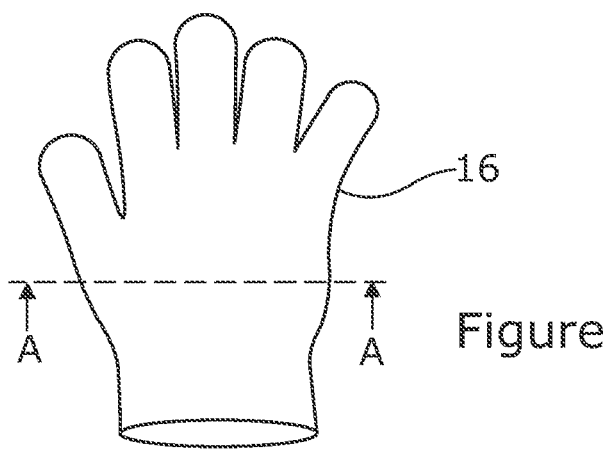
Figure 2:
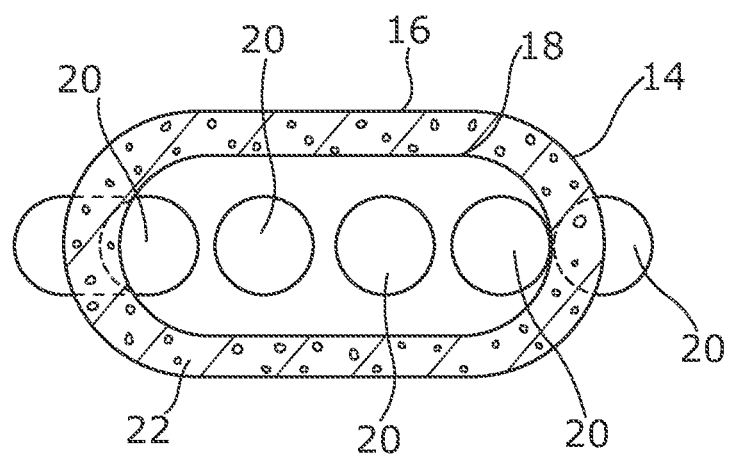
FIG. 2 illustrates a cross section through the wall of the glove along line A-A.

Typically, the gloves are produced by a process in which a glove-shaped former is immersed for a relatively short period of time in the liquid material and then allowed to cool and harden and removed from the former so as to form the wall of the glove at step 10. An example of which is shown in FIGS. 1 and 2 with the glove having relatively thin wall 14 which defines the outer surface 16 and inner surface 18 of the glove and the cavities 20 into which the user's fingers are placed.

When the glove is worn it is found that the presence of the electro-magnetically and/or X-ray detectable materials 22 within the glove material is to a sufficient density so as to activate detection equipment on the production line of the products so that if a glove or even a relatively small portion of the glove is present in manufactured products leaving a production line then the same is detected by the detection apparatus, production can be paused and steps taken to destroy contaminated products and retrieve the glove or glove portion.

Figure 4:
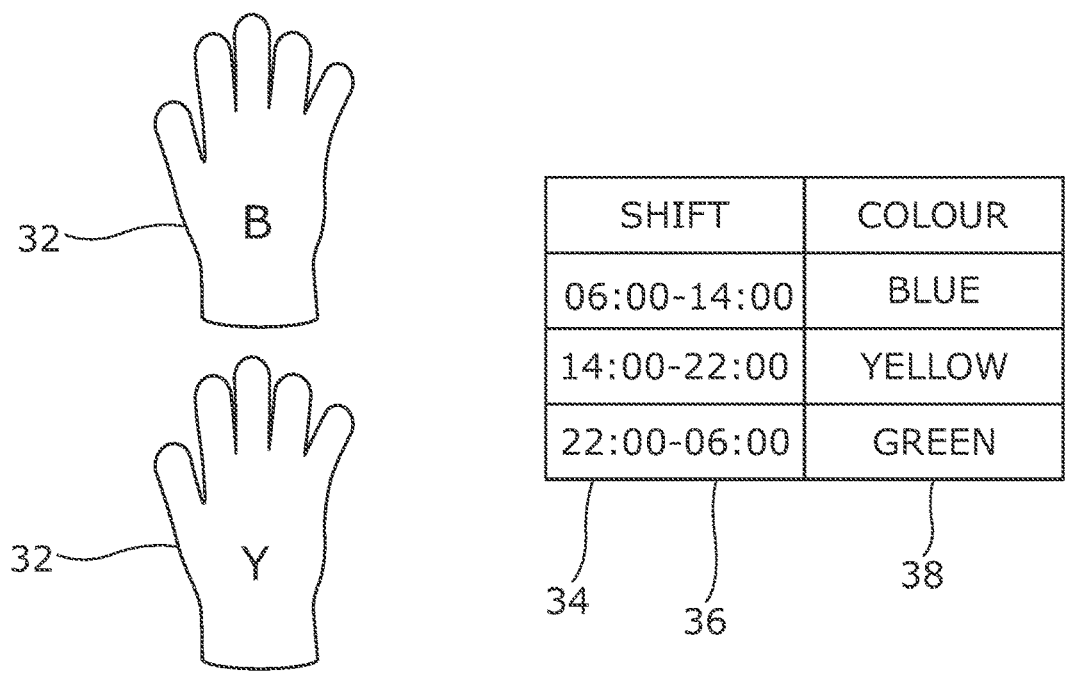
FIG. 4 illustrates a further embodiment of the invention which provides identification means for the gloves linked to one or more parameters of the glove.
Figure 5:
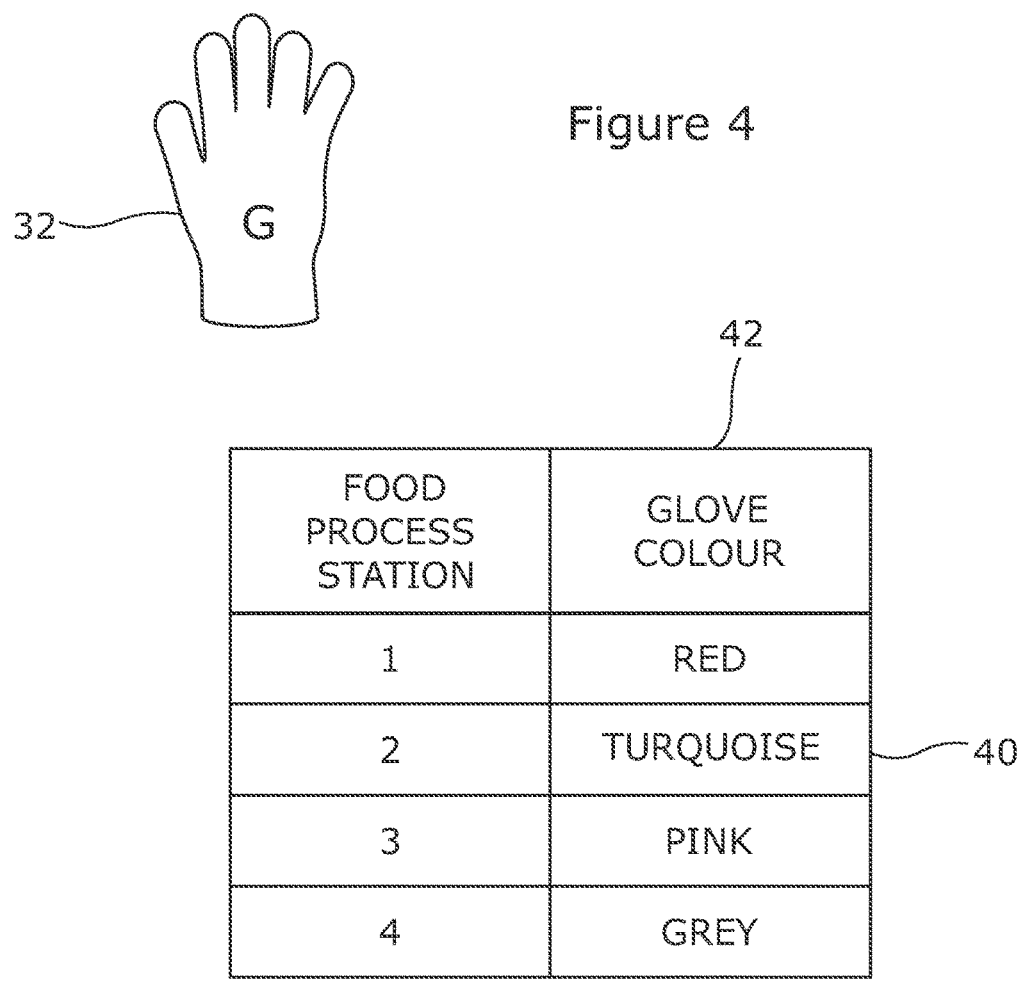
FIG. 5 illustrates a second embodiment of a key or table with respect to which gloves and the identification means thereof can be used in accordance with the invention.

With respect to FIGS. 4 and 5, there are provided a plurality of pairs of gloves 32 which are required to be worn by personnel who are employed to manufacture foodstuffs in a food manufacturing process and using apparatus as part of the process. Typically, the food manufacturing process commences with raw ingredients being mixed together in accordance with a formulation and then passed downstream via a conveying system for subsequent processing, cooking, baking or the like and then packaged to form the foodstuff retail package.

Typically, in all parts of that process, personnel are required to wear gloves in order to meet hygiene requirements and, in accordance with the preferred option, the gloves are provided to be metal and/or X-ray detectable so that if a glove, or a fragment is separated from the remainder of the glove, and enters the food manufacturing process, the presence of the glove or the fragment can be determined and hence appropriate action taken to stop the manufacturing process, remove the glove or fragment and any potentially contaminated food products.

The detection apparatus may be provided at various locations along the fox processing system and/or at the end thereof and, in accordance with the invention, in addition to being able to determine the presence of the glove or fragment, then the provision of the gloves with indication means in accordance with the present invention allows further forensic investigative work to be performed.

In the first embodiment, the gloves 32 are provided in three different colours; blue (B), yellow (Y) and green (G) and are linked to the three shifts of personnel which operate a food processing system in a 24 hour period, such that the first shift which operates between the hours of 06:00 and 14:00 wears blue colour gloves 32B, the second shift which operates between the hours of 14:00 and 22:0) wears yellow colour gloves 32Y and the shift which operates between the hours of 22:00 and 06:00, wears green coloured gloves 32G. The particular gloves and colour of the same which are used, can be left to the particular shift foreman to allocate or, if further security is found to be required, then only the gloves of the particular colour which is appropriate for that shift are made available to the personnel at the start of the particular shift so as to ensure that the personnel of that shift will only wear the appropriate coloured gloves.

Thus, with the key table 34 indicating the shifts 36 and particular glove colours 38 then if a glove 32, or fragment of a glove, is found in the food process apparatus or in the foodstuff then, in addition to being able to remove the fragment or glove, an investigation can also be undertaken to identify the colour of the glove or fragment which has been found, and thereby, with reference to the key table 34, identify the particular shift which wore that colour of glove and hence identify the particular shift time period at which the glove or fragment would have most likely entered the food manufacturing process or foodstuff. This also reduces the number of personnel who are required to be checked to those personnel of the particular shift. This therefore allows, in the first instance, investigative work to be more focused on a particular time and number of personnel and, furthermore, simplifies the preventative measures which may be necessary to prevent the accidental placement of the glove or fragment into the foodstuff or, if the same is deliberate, to take action to prevent that happening again. This invention also offers customers the option to colour coordinate gloves to particular areas of the works to denote allergens i.e. meat, nuts and fish.

With regard to FIG. 5, there is illustrated a further potential use of the key table and colour coding, which may be used independently of, or in conjunction with, the embodiment shown in FIG. 4.

In this case, the key table 40 allocates particular colours 42, in this case red, turquoise, pink and grey, to operators employed at different stations 1-4 of the food manufacturing process and hence, the different coloured gloves which are required to be worn by personnel are allocated to different stations of the food manufacturing process and once again, if a fragment or glove. 42 is found in the process, the particular colour of the same is identified, and the station location in the food manufacturing process at which that glove of that colour was used. As a result, it is possible to identify where the glove entered the food manufacturing process and appropriate action can then be taken with regard to the apparatus at that location and/or personnel operating apparatus at that particular location.

Typically, the particular colour of the glove is determined at the time of manufacture of the same and most typically, the glove will be of the same uniform colour. The range of colours may be provided to match the required differentiations of personnel, times of use and/or locations of use as required.

With regard to the determination of what makes a glove detectable to a an acceptable level, then there are many factors that affect detectability: size, orientation, sensitivity, phase set up and type of test matter and whether tested in wet or dry conditions.

However as an example of a test process which can be used to determine an acceptable level of detectability, test pieces which depict a contaminating item of a known size are passed through the detection apparatus so as to be able to compare the detection apparatus detection readings of the test piece with the detection readings from for example a portion of a glove in accordance with the invention and thereby ensure that the glove is detectable to an acceptable level.

As an example, a minimum passable detectable value of a glove in accordance with the invention are now provided along with those of the test pieces using the same detection apparatus.

Using a GK Metal Detector with the orientation of the glove in accordance with the invention being with its length laid across the movement belt of the apparatus so that the length is perpendicular to the direction of movement of the belt through the apparatus.

In Dry Mode (140 Sensitivity/90 phase):
Minimum detection value which is acceptable—220-250 signal Glove detection signal 270-510
Detection Signal Test Pieces Equivalence:
Test piece 1: 0.8 mm chrome item—561,
Test piece 2 0.8 mm brass item—650,
Test piece 3 1.2 mm Stainless steel item—505.
In Dry Mode (140 Sensitivity/0.00 phase)
Glove A detection signal 650
Glove B detection signal 1886

Thus it will be appreciated that the acceptable level of detectability of the glove with regard to the capability of the same to be detected by metal detection apparatus and/or X-ray detection apparatus can be conveniently checked by using the said detection apparatus and passing test piece items and the glove through the apparatus then comparing the level of detectability signals of the glove with the test piece items so as to ensure that the glove achieves includes sufficient detectable material to achieve the acceptable detection level for the purpose of use.

The invention claimed is:

1. A glove, said glove formed to be located around a palm and back of a hand and fingers of the hand of a user, said glove formed of a continuous sheet material which is sufficiently pliable to allow manipulation of the user's hand without any substantial restriction and wherein the said glove includes therein one or more materials to render the glove, or a fragment thereof, to be detectable by at least X-ray detection apparatus or metal detectable apparatus, wherein the glove is provided with an indicator linked to a key or table to allow a parameter relating to the glove to be determined with reference to the key or table.

2. The glove according to claim 1, wherein at least one of the one or more materials are provided in a powder form to be added to polymer material in a liquid form to form said sheet material.

3. The glove according to claim 2, wherein an average particle size is in the range of 50-200 microns.

4. The glove according claim 1, wherein one or both of the metal or X-ray detectable materials are formed and provided as a liquid which is added to the material from which the glove is formed when in a liquid condition.

5. The glove according to claim 1, wherein the glove sheet material is formed from a polymer material which is initially provided in a liquid uncured prepolymer condition and into which the one or more detectable materials are added.

6. The glove according claim 1, wherein the metal detectable material is a bronze alloy of copper with aluminium, manganese, beryllium and/or coronium.

7. The glove according to claim 1, wherein the metal detectable material is an alloy of copper and tin.

8. The glove according to claim 1, wherein the X-ray detectable material is a common contrast agent.

9. The glove according to claim 8, wherein the common contrast agent is selected from the group consisting of: barium sulphate or iodine and a combination of barium sulphate and iodine.

10. The glove according to claim 1, wherein a portion or portions of the glove deemed to be more susceptible to be detached from a remainder of the glove during use of the same are determined and the metal and/or X-ray detectable material is provided with a greater density at said portions of the glove.

11. The glove according to claim 1, wherein the glove includes an antimicrobial agent within a wall of the glove and/or at a surface thereof.

12. The glove according to claim 11, wherein the antimicrobial agent is or includes a photosensitiser so as to be activated by exposure of the glove to light and/or oxygen.

13. The glove according to claim 1, wherein the indicator is a particular colour of the glove and/or pattern applied thereto.

14. The glove according to claim 1, wherein the said parameter is selected from the group consisting of: any or any combination of the source of the glove, time period of use of said glove, a particular identity of a person or group of persons wearing the glove, a location of use of the glove, a type of said glove and a particular status of personnel using the glove.

15. Apparatus including a glove, said glove rendered detectable by at least one of metal detection apparatus or X-ray detection apparatus by the inclusion in the glove of one or more substances which are detectable by the at least one of metal detection apparatus or X-ray detection apparatus; the apparatus comprising:
   a key or table including data relating to one or more parameters relating to the glove, and wherein an indicator of the glove is linked to the key or table to allow at least one parameter value of the said key or table to be determined and allocated to said glove.

16. The apparatus according to claim 15, wherein the indicator is a provision selected from a group consisting of: a particular colour of the entire glove or at least part thereof and a pattern applied thereto.

17. The apparatus according to claim 16, wherein a predetermined range of colours and/or patterns provided on said gloves are defined on the said key or table.

18. The apparatus according to claim 17, wherein the key or table matches the said range of colours and/or patterns to any selected from a group consisting of: or any combination of, parameters in the form of, a time of use of the glove, a particular identity of the person or group of persons wearing gloves of that colour or pattern, a location of use of the glove, a type of glove and a particular status of personnel using the glove.

19. The apparatus according to claim 18, wherein the key or table matches the type of glove to any of a glove which is detectable by metal detectable apparatus, a glove which is detectable by X-ray detection apparatus, a glove which is detectable by both metal and X-ray detection apparatus, a glove which has antimicrobial characteristics and/or a glove which is biodegradable.

20. The apparatus according to claim 15, wherein the indicator and key or table identifies to personnel the specific format of glove which should be selected to be worn when using or working with a specific manufacturing process and/or apparatus.

21. A method of manufacturing a glove from a plastics and/or rubber material, said method including the steps of:
   preparing a reservoir of said material in a liquid form;
   using a quantity of said material to form a continuous wall of the glove on a former; and
   wherein there is added to the said material when in the liquid form, a substance or substances such that when formed, the glove or a fragment thereof is rendered detectable by at least X-ray or metal detection apparatus.

22. The method according to claim 21, wherein the same or a further substance is added to the material in a liquid form and/or when formed to provide the glove with an antimicrobial characteristic.

* * * * *